US010970717B2

(12) United States Patent
Menon (10) Patent No.: US 10,970,717 B2
(45) Date of Patent: Apr. 6, 2021

(54) DISTRIBUTED LEDGER FOR ENCRYPTED DIGITAL IDENTITY

(71) Applicant: Dish Network, L.L.C., Englewood, CO (US)

(72) Inventor: Anand Menon, Lone Tree, CO (US)

(73) Assignee: DISH Network L.L.C., Englewood, CO (US)

( * ) Notice: Subject to any disclaimer, the term of this patent is extended or adjusted under 35 U.S.C. 154(b) by 361 days.

(21) Appl. No.: 16/159,050

(22) Filed: Oct. 12, 2018

(65) Prior Publication Data

US 2020/0118124 A1 Apr. 16, 2020

(51) Int. Cl.
| | |
|---|---|
| *G06Q 20/38* | (2012.01) |
| *G06Q 20/40* | (2012.01) |
| *G06Q 20/02* | (2012.01) |
| *H04L 9/06* | (2006.01) |
| *H04L 9/08* | (2006.01) |
| *H04L 9/32* | (2006.01) |

(52) U.S. Cl.
CPC ......... *G06Q 20/3829* (2013.01); *G06Q 20/02* (2013.01); *G06Q 20/3827* (2013.01); *G06Q 20/409* (2013.01); *G06Q 20/4014* (2013.01); *H04L 9/0643* (2013.01); *H04L 9/0825* (2013.01); *H04L 9/3236* (2013.01); *H04L 9/3297* (2013.01)

(58) Field of Classification Search
None
See application file for complete search history.

(56) References Cited

U.S. PATENT DOCUMENTS

| | | | | |
|---|---|---|---|---|
| 10,546,296 | B2 * | 1/2020 | Narasimhan | ....... G06Q 20/3829 |
| 10,805,085 | B1 * | 10/2020 | Liang | ................. G06Q 20/3829 |
| 10,841,307 | B2 * | 11/2020 | Smith | ................... H04L 9/3268 |
| 2018/0183587 | A1 | 6/2018 | Won et al. | |
| 2018/0294956 | A1 | 10/2018 | O'Brien et al. | |
| 2019/0018947 | A1 | 1/2019 | Li et al. | |
| 2020/0067907 | A1 * | 2/2020 | Avetisov | ............... H04L 9/3218 |

FOREIGN PATENT DOCUMENTS

| | | |
|---|---|---|
| CN | 107370730 A | 11/2017 |
| EP | 3388965 A1 * | 10/2018 ........... H04L 9/3271 |

OTHER PUBLICATIONS

U. Guin, P. Cui and A. Skjellum, "Ensuring Proof-of-Authenticity of IoT Edge Devices Using Blockchain Technology," 2018 IEEE International Conference on Internet of Things (iThings), Halifax, NS, Canada, 2018, pp. 1042-1049, doi: 10.1109/Cybermatics_2018. 2018.00193. (Year: 2018).*

(Continued)

*Primary Examiner* — Jacob C. Coppola
(74) *Attorney, Agent, or Firm* — Perkins Coie LLP (57) ABSTRACT

The disclosed technique includes identity verification implanted via a blockchain. An identity system utilizes a key library to store private keys and a smart contract functionality to facilitate verification with third-party users. The identity system generates a public key based on the private key where the public key is stored on a blockchain. The public key stored on the blockchain can be retrieved by a third-party user via the smart contract functionality to authenticate a user on the blockchain.

15 Claims, 6 Drawing Sheets

(56) References Cited

OTHER PUBLICATIONS

D. Li, W. Peng, W. Deng and F. Gai, "A Blockchain-Based Authentication and Security Mechanism for IoT," 2018 27th International Conference on Computer Communication and Networks (ICCCN), Hangzhou, 2018, pp. 1-6, doi: 10.1109/ICCCN.2018.8487449. (Year: 2018).*

A. S. Omar and O. Basir, "Identity Management in IoT Networks Using Blockchain and Smart Contracts," 2018 IEEE International Conference on Internet of Things (iThings), Halifax, NS, Canada, 2018, pp. 994-1000, doi: 10.1109/Cybermatics_2018.2018.00187 (Year: 2018).*

Caswell, J., "Revoverse, A Decentralized Spatial Universe," © 2018 downloaded Oct. 9, 2019, from revokind.com, 32 pages.

International Search Report and Written Opinion for International Application No. PCT/US2019/055442 dated Dec. 11, 2019, 12 pgs.

* cited by examiner

| Public Key 310 | Encrypted Private Key 315 | Transaction Type 320 | Hash Value 325 | Timestamp 330 |
|---|---|---|---|---|
| 134641 | f5asd456h0083e5f378bfd837 | Electronic Transfer | e0d123e5f316bef78bfdf5a008837 | April 15, 2017 @ 0800 |
| 459782 | d1e5f31621ef78bfdf5a00883 | Credit Inquiry | cc273fe9d442850fa18c31c88c823 | Jan. 29, 2018 @ 1500 |
| ... | ... | ... | ... | ... |

DISTRIBUTED LEDGER FOR ENCRYPTED DIGITAL IDENTITY

TECHNICAL FIELD

The present application is related to blockchain technology, and more specifically to methods and systems for implementing a distributed ledger for an encrypted digital identity.

BACKGROUND

Blockchain implementations typically include a distributed ledger that can record transactions between two parties efficiently and in a verifiable and permanent way. Blockchain technology has been used for implementing cryptocurrencies. Typically, each block contains a cryptographic hash of the previous block, a timestamp, and transaction data.

Conventional blockchain implementations are managed by a peer-to-peer network collectively adhering to a protocol for inter-node communication and validating new blocks. Once recorded, the data in any given block cannot be altered retroactively without alteration of all subsequent blocks, which requires consensus of the network majority. Though blockchain records are not unalterable, blockchains may be considered secure by design and exemplify a distributed computing system with high Byzantine fault tolerance.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

The disclosed technique includes methods and systems for implementing a distributed ledger for an encrypted digital identity. A private key can be used to implement an identity as a service on a blockchain. The private key can be implemented in various devices including, for example, as a subscriber identity module (SIM) in a mobile device or as an electronic SIM, as an identification mechanism (e.g., within a passport), in an internet of things (IoT) sensor, or any combination thereof. An identity service can track the private key associated with a device as the device connects and reconnects to various networks (e.g., a 5G network).

The private key can be assigned to an individual as a digital identity. The private key is stored in a key library including private keys associated with a plurality of individuals. In an embodiment, the private key can be used to as an electronic signature (e-signature) for an electronic contract. In an embodiment, the private key can be used to replace a SIM in a mobile device or as an electronic SIM (e-SIM).

A private key implemented as a SIM can be used to verify an identity associated with a device upon access to a wireless network (e.g., an Internet of Things of 5G network). For example, a sensor connected to a mobile device (e.g., an automobile or mobile phone) can come within range of an access point (e.g., a cellular tower) of a network. A computer managing the access point and/or network can automatically route a registration request to an identity system upon detecting the sensor of the mobile device within range of the network. The identity system can initiate a transaction on a blockchain including the private key in response to the registration request.

The identity system utilizes the key library to implement a distributed computing platform and operating system featuring a smart contract functionality. The distributed computing platform generates a public key based on the private key where the public key is stored on a blockchain.

The public key stored on the blockchain can be retrieved by a third-party user to verify a transaction by a user on the blockchain. For example, a mobile device (e.g., an automobile) can move and come within range of an access point (e.g., cellular tower) of a third-party network. The third-party network can access the blockchain to retrieve sensor credentials (e.g., a public key) to verify a user identity. To access blockchain data, a third-party network can initiate a smart contract overlaid on the identity blockchain.

Embodiments include a smart contract implementation enabling a user to manage third-party user access to user data stored on the blockchain. For example, a user can query the identity system to cause the identity system to implement a smart contract restricting access to user data from a third-party network (or set of third-party networks). A user can set access limitations based on individual devices (e.g., car, house, specific sensors, etc.). Thus, by employing a smart contract overlaid on the blockchain, a user can tailor privacy settings according to individual preferences.

Figure 1A:
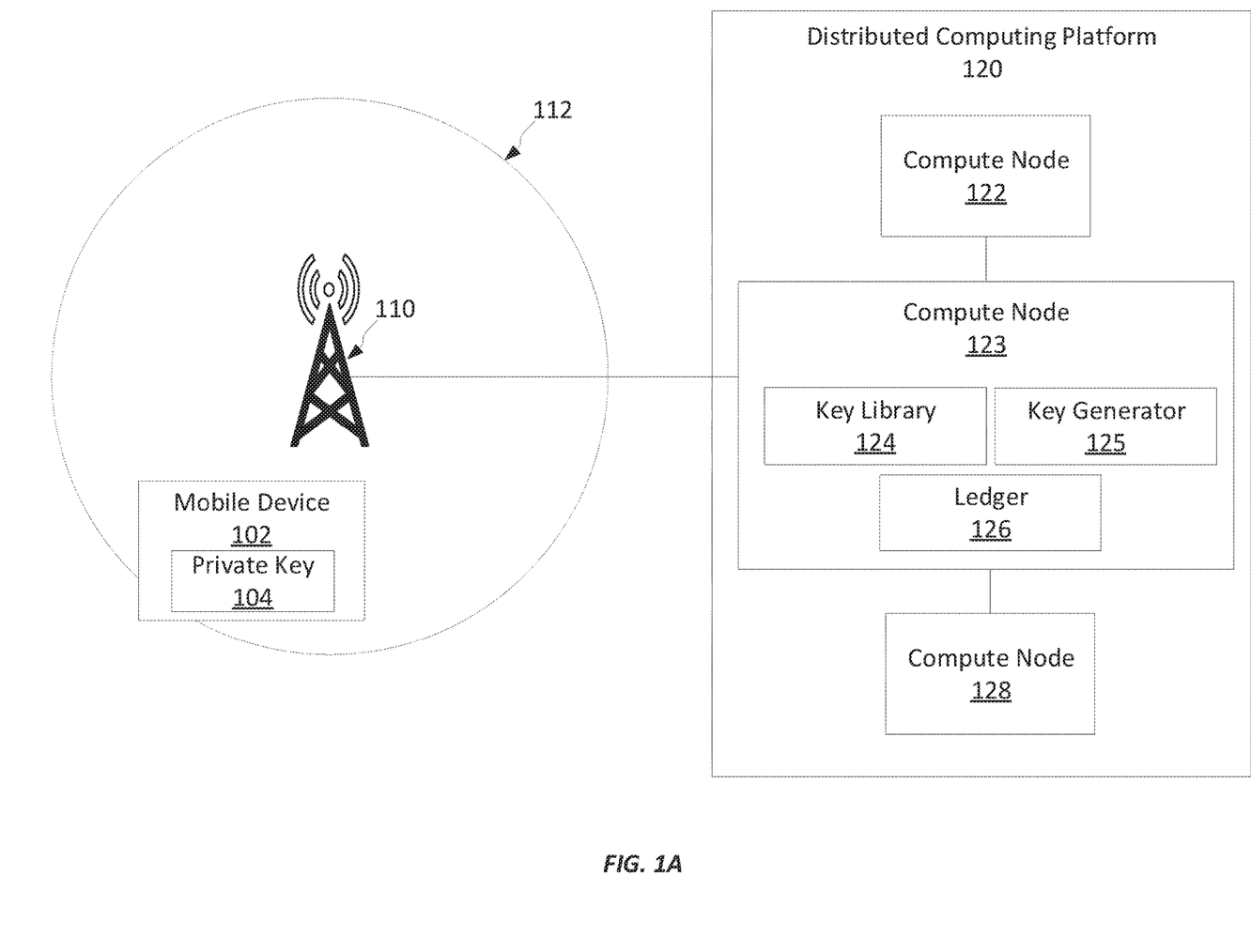
FIG. 1A illustrates an example of a distributed computing platform wirelessly connected to a mobile device.

FIG. 1A illustrates a distributed computing platform 120 connected to a mobile device 102 via a wireless antenna 110. The mobile device 102 can be within a wireless range 112 of the wireless antenna 110. The wireless antenna 110 can include, for example, a router (e.g., a WiFi router), cellular antenna (e.g., 4G and/or 5G antenna), a transponder (e.g., a communications satellite transponder), or a combination thereof. The wireless antenna 110 can be connected (e.g., via a network) to a distributed computing platform 120.

The distributed computing platform 120 can include a plurality of compute nodes (e.g., compute node 122, compute node 123, and compute node 128). Each compute node can include a key library 124, a key generator 125, and a copy of ledger 126. The ledger 126 can include blocks indicative of a transaction and a public key. The public key can be generated by a key generator 125 and be based on a private key (e.g., private key 104) associated with a user of a mobile device (e.g., mobile device 102).

Mobile device 102 can include a private key 104. The private key 104 can be an identity token for an entity (e.g., a person or company). The mobile device 102 can transmit data indicative of the private key 104. For example, the mobile device 102 can transmit a cryptographic one-way hash of the private key 104.

The distributed computing platform 120 can receive the cryptographic one-way hash of the private key 104. Upon receiving the cryptographic one-way hash of the identity key, distributed computing platform 120 implements a series of steps to verify that the correct private key 104 was provided. However, since the cryptographic one-way hash of the identity key is non-reversible, the distributed computing platform 120 cannot simply reverse the cryptographic hash to verify the identity of the user. The non-reversibility of the cryptographic hash improves security by preventing a third-party from being able to determine the private key 104 by intercepting data transmitted between the mobile device 102 and the distributed computing platform 120.

In response to receiving the cryptographic one-way hash of the identity key, the distributed computing platform 120 can retrieve a private key associated with the user of the mobile device 102 from the key library 124. The key library 124 can be stored locally on a compute node 123 or in a centralized data vault or as an identity as a service transaction (e.g., key library 135 of FIG. 1B). The distributed computing platform 120 performs the cryptographic one-way hash on the private key retrieved key library 124 to produce a compute node version of the cryptographic one-way hash of the private key. The distributed computing platform 120 determines if a threshold correspondence exists between the compute node generated cryptographic hash and the cryptographic hash received from the mobile device 102. If a correspondence between the cryptographic hashes exceeds a threshold, the user identity is verified. If a correspondence between the cryptographic hashes fails to exceed the threshold, the user identity is not verified.

In an embodiment, the mobile device 102 can move out-of-range of a carrier network (e.g., including the distributed computing platform 120) and in-range of a third-party network (not shown). The distributed computing platform 120 can implement a smart contract with the third-party network to facilitate authentication of an identity of the user.

Figure 1B:
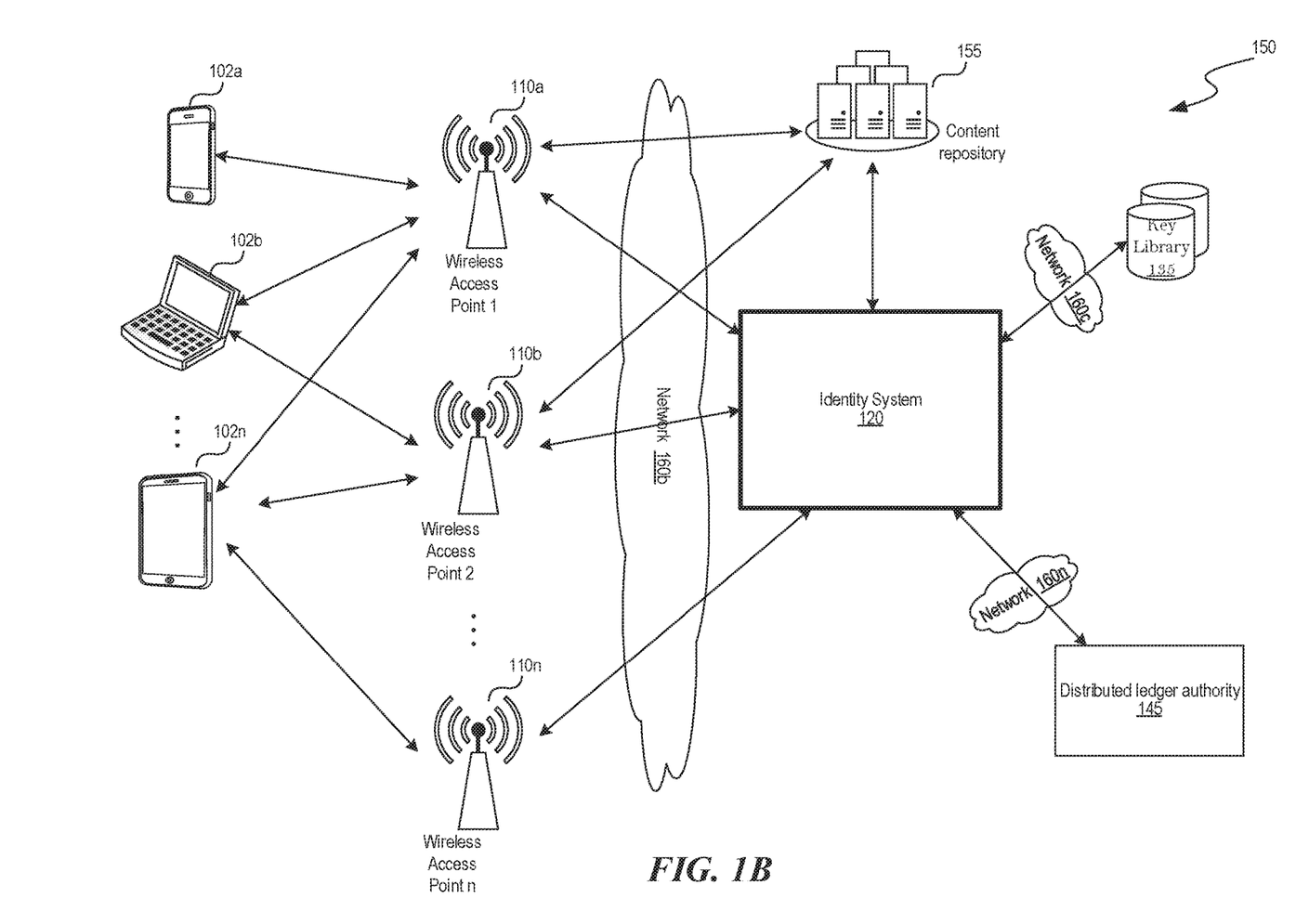
FIG. 1B illustrates an example of an identity system managing communications with a plurality of wireless access points.

FIG. 1B illustrates an example of a communications environment 150 in which an identity system 120 manages communications with a plurality of wireless access points 110*a*, 110*b*, . . . , 110*n*. In an embodiment, the wireless access points 110*a*, 110*b*, . . . , 110*n* can include, for example, a router, cellular antenna, or a combination thereof. A cellular antenna can include, for example, a 4G and/or 5G cellular antenna. Users can use various electronic devices (e.g., mobile device 102*a*, laptop/PC 102*b*, . . . , tablet 102*n*) to initiate a communication with wireless access points 110*a*, 110*b*, . . . , 110*n* via a Local Area Network ("LAN"), Wide Area Network ("WAN") (e.g., a terrestrial or satellite WAN), or a combination thereof.

The identity token for an entity (e.g., person or company) may be the public key of a public/private key pair, where the private key is held by the entity. Identity tokens can be used to identify people, institutions, digital content, contracts, computer code, and so on. An identity token for a collection may be a cryptographic one-way hash of the digital tokens of the digital content assets in the collection. The creation of an identity token for an asset in a blockchain establishes provenance of the asset, and the identity token can be used in transactions (e.g., uploading, editing, distributing) of the digital content asset stored in a blockchain, creating a full audit trail of the transactions.

A communication can include identity data indicative of an identity key associated with a user of an electronic device (e.g., mobile device 102*a*, laptop/PC 102*b*, . . . , tablet 102*n*). The identity data can include a cryptographic one-way hash of information that uniquely identifies the device. The public key can be set as a token owner identity. When performing actions against tokens, ownership proof is established by providing a signature generated by the private key and validated against the public key listed as the owner of the token. A person can be uniquely identified, for example, using a combination of a user name, social security number, and biometric information (e.g., by capturing fingerprint and/or facial data).

In an embodiment, the identity system 120 examines the communication to determine if it includes identity data indicative of an identity key associated with a user of an electronic device. The identity system 120 can then communicate with one or more key libraries 135 via network 160*c* and/or the distributed ledger authority 145 via network 160*n* to verify an identity of the user. The data key libraries 135 can store information including, but not limited to private keys associated with corresponding users, public keys associated with corresponding users, encryption key(s), user information (e.g., user identifier, roles, permissions, etc.), etc.

With a distributed ledger managed and monitored by the distributed ledger authority 145, a ledger of all the transactions for a digital content is stored redundantly at multiple compute nodes (e.g., compute nodes 122, 123, and 128) of a blockchain network. The ledger at each node is stored as a blockchain. In a blockchain, the transactions are stored in the order that the transactions are received by the nodes. Each node in the blockchain network has a complete replica of the entire blockchain. The identity system 120 (and/or the distributed ledger authority 145) also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The identity system 120 (and/or the distributed ledger authority 145) also implements techniques to ensure that it would be infeasible to change a transaction and regenerate the blockchain by employing a computationally expensive technique to generate a cryptographic nonce that is added to the block when it is created.

The identity system 120 can also communicate with a digital wallet provider (not shown) via a network to verify that funds (e.g., credit, tokens, etc.) for a transaction. For example, if a user identity is verified and the user requests performance of a transaction, the identity system 120 can communicate with the digital wallet provider to check a current balance of the upload user prior to performing the transaction. When the upload user does not have sufficient funds to perform the transaction, the wallet provider can communicate with a currency exchange platform (e.g., a bank, a digital currency provider, a credit-card authority, etc.) to enable the verified user to add funds to their digital wallet account.

Figure 2:
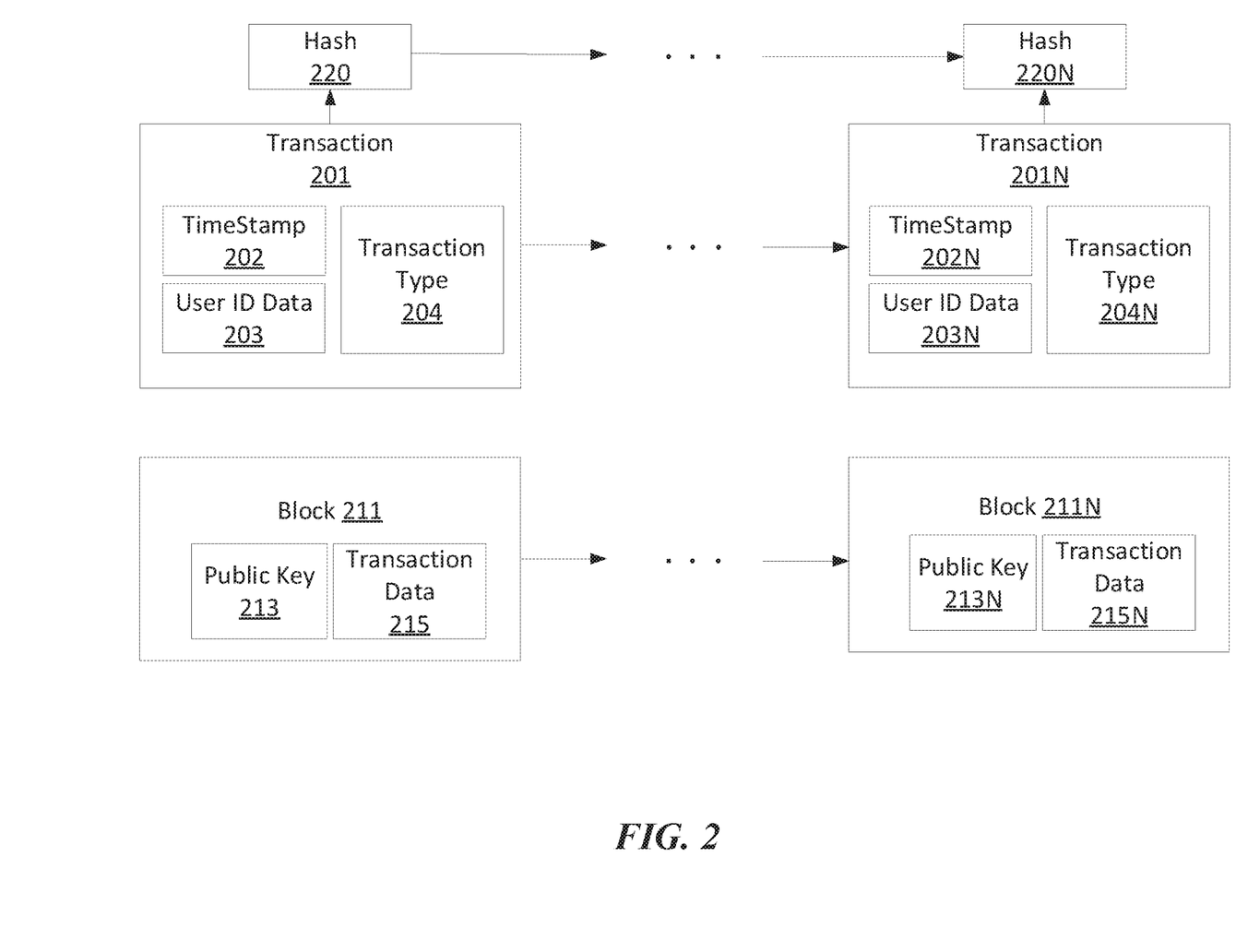
FIG. 2 illustrates blockchain transactions used to produce record blocks indicative of a user identity.

FIG. 2 illustrates blockchain transactions resulting in record blocks indicative of a user identity. The transactions include data stored in the blockchain. The blocks include records of transactions and a public key. A block can represent more than one transaction. For example, block 1 can represent a series of transactions (e.g., from transaction 1 through n).

A blockchain transaction 201 can include data indicative of a real world or digital event (e.g., detecting a mobile device in a network or an electronic funds request). A blockchain transaction maintains a record of the event. For example, each block representing a blockchain transaction can include a timestamp 202 of the transaction, data indicative of a transaction type 204, user identification (ID) data 203, a unique transaction identifier, or any combination thereof. The transaction type 204 can include any type of a pre-defined set of transaction types. For example, transactions types can include an identity authentication related to one or more electronic events. For example, an electronic event can include receiving an inquiry related to a property purchase (e.g., real or personal property), credit inquiry, electric funds transfer, triggering event for an electronic contract (e.g., a smart contract), or any combination thereof. The unique transaction identifier can result in searchable transactions.

A plurality of blockchain transactions can extend from, for example, blockchain transaction 201 to blockchain transaction 201N. Each blockchain transaction within a transaction series can include data indicative of an event (e.g., related to identity authentication). For example, blockchain transaction 201N can include a timestamp 202N of the transaction, data indicative of a transaction type 204N, user identification (ID) data 203N, a unique transaction identifier, or any combination thereof.

Each block can include a cryptographic hash of the previous block. For example, blockchain transaction 201 can include a hash 220 and blockchain transaction 201N can include a hash 220N. Using the previously hash function as input to a subsequent hash function can ensure that there has been no tampering or alteration of the data in the record blockchain.

Blocks (e.g., block 211 through block 211N) contain an anonymous identity information (e.g., a public key 213 and/or encrypted identity information). The public key 213 may not include personally identifying information (e.g., a name of a user). The public key 213 can include anonymized data unique to a particular user. The public key 213 can be used to identify transactions (e.g., property purchase, credit inquiry, and/or electric funds transfer) associated with a user without personally identifying the user. Encrypted identity information can be encrypted with a symmetrical key, a public-private key, or a combination of cryptographic keys. In an example, a unique key is required for a unique lock used for separate portions of the encrypted identity information.

Transaction data 215 can indicate a transaction type (e.g., transaction type 204) and include a transaction serial number. The transaction serial number can be used to individually identify a particular transaction. The transaction data 215 may be encrypted. For example, a transaction including sensitive data (e.g., a credit inquiry including a social security number) may be encrypted to limit access to the transaction data 215.

Figure 3:
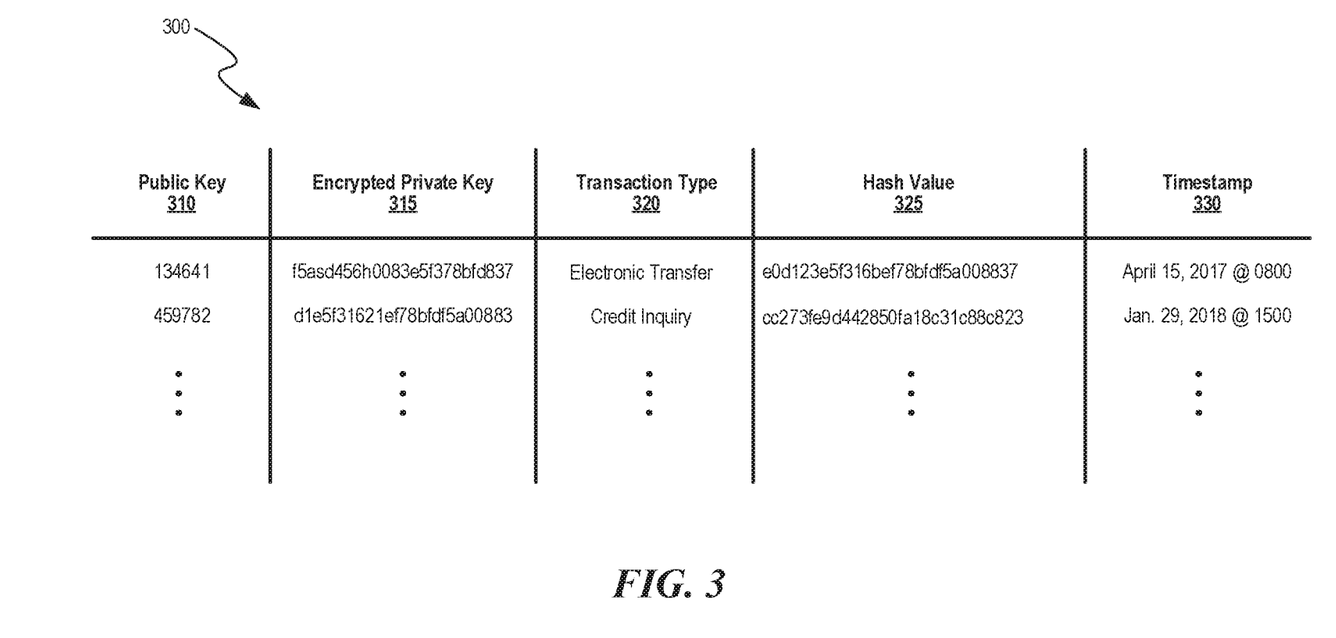
FIG. 3 is an exemplary data structure showing contents of a distributed ledger for maintaining information about user identity.

FIG. 3 illustrates an exemplary data structure 300 showing contents of a distributed ledger for maintaining identity information. Exemplary data structure 300 shows contents of a distributed ledger for maintaining one or more of the following identity information: public key 310, encrypted private key 315, transaction type 320, hash (and/or encrypted) value 325, transaction timestamp 330.

Data structure 300 includes two entries. One entry corresponds to an electronic transfer transaction type associated with a user having a public key of 134641. Another entry corresponds to a credit inquiry transaction type associated with a user having a public key of 459782.

Each entry includes an encrypted private key 315. The encrypted private key 315 can be an identity token for an entity (e.g., a person or company). The encrypted private key 315 can be received from a mobile device (e.g., the mobile device 102 of FIG. 1A). The encrypted private key 315 can be, for example, a cryptographic one-way hash of an identity key. Since a cryptographic one-way hash of an identity key is non-reversible, a third-party cannot determine the private identity key based on the encrypted private key 315.

The hash value 325 can be a cryptographic hash of the previous block. A hash value of a previous block can be used to generate the hash value 325. A subsequent hash value can be generated based on the hash value 325. Hash values generated based on previous hash values can ensure that there has been no tampering or alteration of the data in the blockchain.

Figure 4:
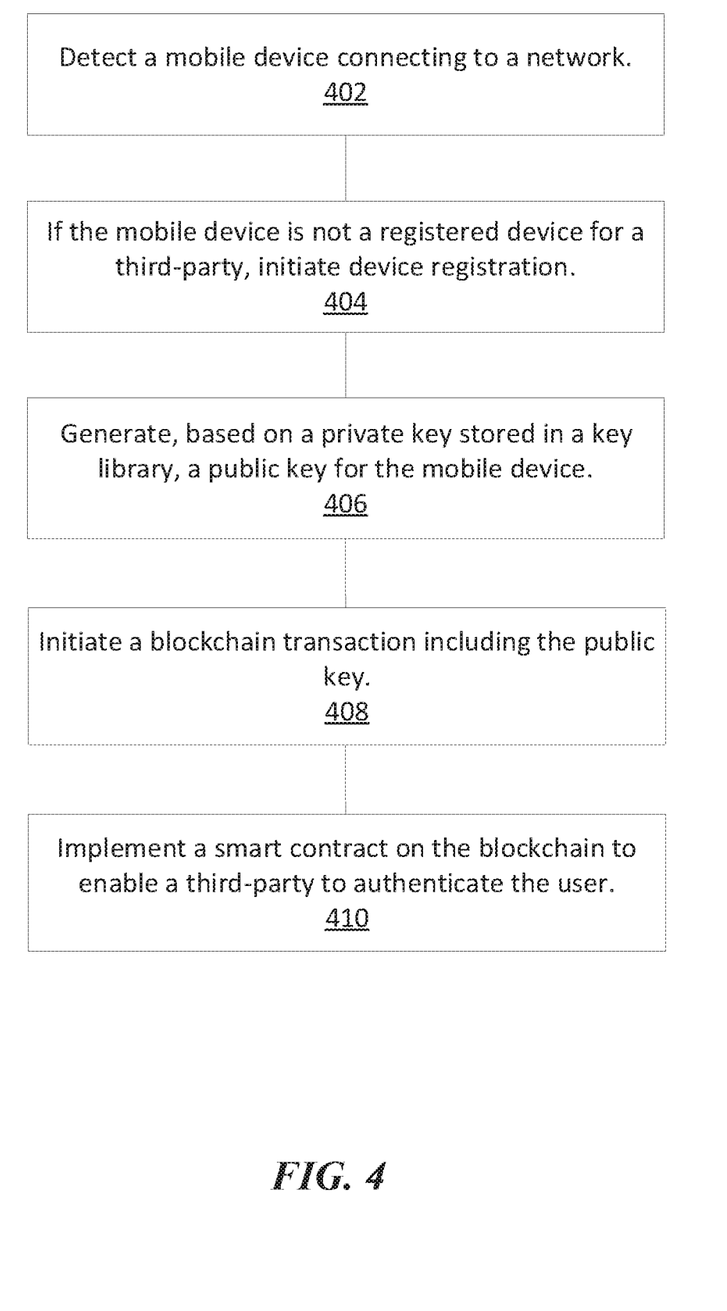
FIG. 4 illustrates a blockchain identity method executed by an identity system.

FIG. 4 illustrates a method executed by an identity system. The method can include detecting a mobile device connecting to a network (step 402), initiating third-party mobile device registration (step 404), generating a public key for the mobile device based on a private key stored in a key library (step 406), initiating a blockchain transaction including the public key (step 408), and implementing a smart contract on the blockchain to enable a third-party to authenticate the user (step 410).

Step 402 can include detecting a mobile device (e.g., a smart phone or sensor) in the processes of connecting or already connected to a network (e.g., a cellular network). The mobile device can be detected by, for example, receiving a request to join the network, receiving a message from the mobile device through the network, intercepting a communication of the mobile device on the network, or a combination thereof. The mobile device can be detected by a network provider and/or the identity system.

Upon detecting the mobile device, the identity system can associate a user of the mobile device with private keys. The private keys are stored in a key library of the identity system. The private keys can be configured for incorporation in an identity blockchain. A blockchain transaction can be initiated for mobile device detection event. The blockchain transaction can include a timestamp of the mobile device detection, data indicative of the transaction type (i.e. mobile device detection), user identification data, a unique transaction identifier, or any combination thereof.

The identity system can initiate third-party registration of a mobile device (step 404). If the mobile device is not a registered device, the identity system can receive a registration request from a third-party user. A third-party user can include, for example, a network provider (e.g., a cellular network provider). Upon receiving the registration request, the identity system can generate a public key for the mobile device based on a private key stored in a key library (step 406). In response to the registration request and upon generating the public key, the identity system initiates a blockchain transaction including the public key stored in the key library.

A blockchain transaction (e.g., an identity inquiry transaction type) including the public key can be initiated (step 408). The blockchain transaction results in a new block in the blockchain having the public key and a cryptographic hash value based on a hash value from a previous block. The blockchain transaction can be stored in a private blockchain between one or more mobile service providers.

Step 410 includes implementing a smart contract on the blockchain to enable a third-party to authenticate the user. The smart contract is a computer protocol resulting in a trackable and irreversible record of the implementation of the contract. For example, the smart contract can be executed using cryptographic hash chains and Byzantine fault tolerant replication. Upon execution of the smart contract, the identity system provides authentication information (e.g., including verification information and the public key) to the third-party.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Computer

Figure 5:
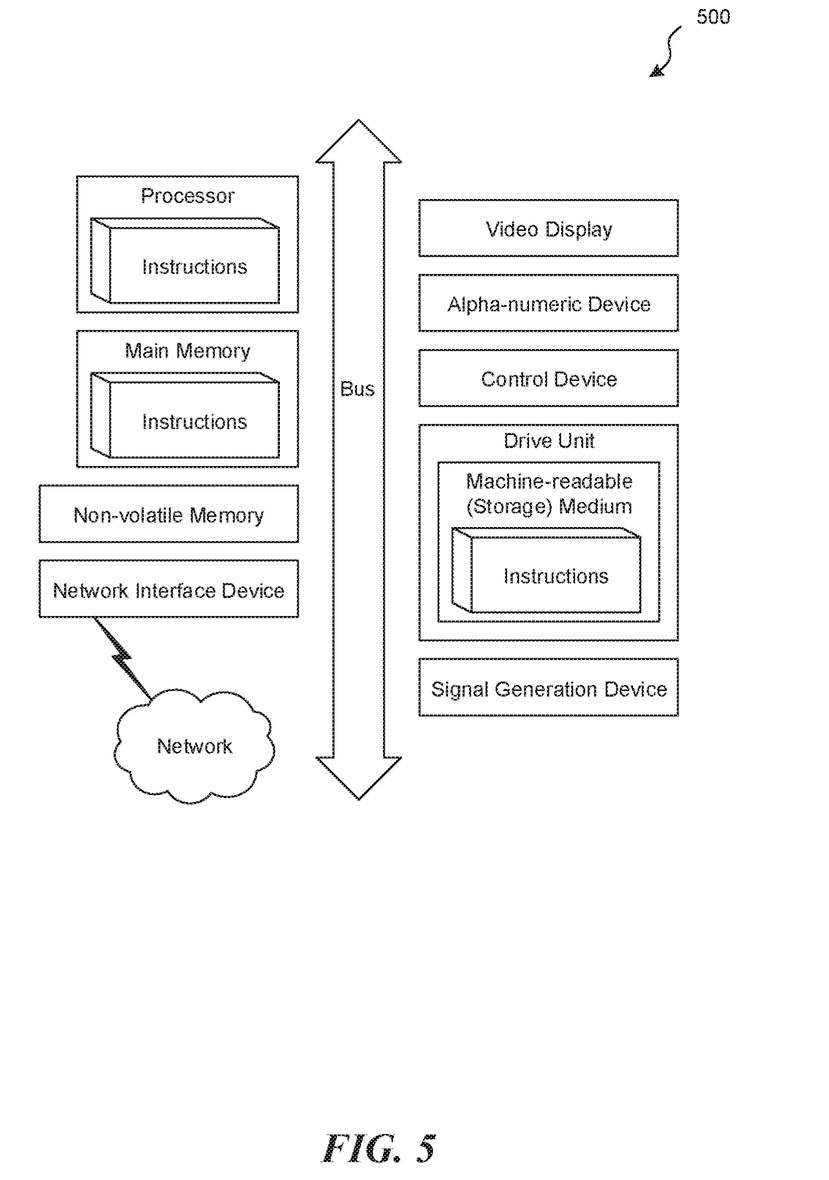
FIG. 5 is a diagrammatic representation of a computer system within which the above-described apparatus may be implemented, and within which a set of instructions for causing the machine to perform any one or more of the methodologies or modules discussed herein may be executed.

FIG. 5 is a diagrammatic representation of a machine in the example form of a computer system 500 within which a set of instructions, for causing the machine to perform any one or more of the methodologies or modules discussed herein, may be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

One of skill in the relevant art will recognize that the terms "machine-readable (storage) medium" or "computer-readable (storage) medium" include any type of device that is accessible by the processor. The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A method for authenticating a user comprising:
   associating private keys with users of an identity system, the private keys being stored in a key library of the identity system;
   receiving, by a third-party user, a request to register a mobile device;
   in response to the registration request:
      identifying the user from among the users of the identity system associated with the mobile device;
      generating a public key for the mobile device based on a private key in the key library, the private key being associated with the identified identity system user; and
      initiating a blockchain transaction including the public key for the identity system user;
   implementing a smart contract on the blockchain to enable the third-party user to authenticate the identity system user;
   receiving a cryptographic one-way hash of a mobile identity key from the mobile device;
   in response to receiving the cryptographic one-way hash of the mobile identity key, retrieving the private key associated with the identity system user from the key library;
   performing a cryptographic one-way hash on the private key; and determining if a threshold correspondence exists between the cryptographic hash of the private key and the cryptographic hash of the mobile identity key.

2. The method of claim 1, further comprising:
identifying the identity system user from among the users of the identity system associated with the mobile device based on mobile device data received along with the registration request.

3. The method of claim 1, wherein upon determining that the threshold correspondence exists, verifying a user of the mobile device as the identity system user.

4. The method of claim 1, wherein upon determining that the cryptographic hash of the private key and the cryptographic hash of the mobile identity key lack the threshold correspondence, declining to verify a user of the mobile device as the identity system user.

5. The method of claim 1, further comprising:
transmitting the verification results to the third-party user upon implementing the smart contract.

6. The method of claim 1, wherein the third-party user is a cellular network provider.

7. An identity system for authenticating a user, comprising:
a distributed computing platform;
a key library comprising associations between private keys and users of the identity system; and
a processor configured to:
receive a request to register a mobile device by a third-party user;
in response to the registration request:
identify the user from among the users of the identity system associated with the mobile device;
generate a public key for the mobile device based on a private key in the key library, the private key being associated with the identified identity system user; and
initiate a blockchain transaction including the public key for the identity system user;
implement a smart contract on the blockchain to enable the third-party user to authenticate the identity system user;
receive a cryptographic one-way hash of a mobile identity key from the mobile device;
in response to receiving the cryptographic one-way hash of the mobile identity key, retrieve the private key associated with the identity system user from the key library;
perform a cryptographic one-way hash on the private key; and
determine if a threshold correspondence exists between the cryptographic hash of the private key and the cryptographic hash of the mobile identity key.

8. The identity system of claim 7, wherein the processor is further configured to:
identify the identity system user from among the users of the identity system associated with the mobile device based on mobile device data received along with the registration request.

9. The identity system of claim 7, wherein upon determining that the threshold correspondence exists, verifying a user of the mobile device as the identity system user, and wherein upon determining that the cryptographic hash of the private key and the cryptographic hash of the mobile identity key lack the threshold correspondence, declining to verify a user of the mobile device as the identity system user.

10. The identify system of claim 7, wherein the processor is further configured to: transmit the verification results to the third-party user upon implementing the smart contract.

11. A method for authenticating a user, comprising:
providing an identity system comprising a distributed computing platform and a key library, wherein the key library comprises associations between private keys and users of the identity system;
receiving, by a third-party user, a request to register a mobile device;
in response to the registration request, performing the following:
identifying the user from among the identity system users associated with the mobile device;
generating a public key for the mobile device based on a private key in the key library, the private key being associated with the identified identity system user; and
initiating a blockchain transaction including the public key for the identified identity system user;
implementing a smart contract on the blockchain to enable the third-party user to authenticate the identified identity system user;
receiving a cryptographic one-way hash of a mobile identity key from the mobile device;
in response to receiving the cryptographic one-way hash of the mobile identity key, retrieving the private key associated with the identity system user from the key library;
performing a cryptographic one-way hash on the private key; and
determining if a threshold correspondence exists between the cryptographic hash of the private key and the cryptographic hash of the mobile identity key.

12. The method of claim 11, wherein the identified identity system user is identified based on mobile device data received along with the registration request.

13. The method of claim 11, wherein upon determining that the threshold correspondence exists, verifying a user of the mobile device as the identity system user.

14. The method of claim 11, wherein upon determining that the cryptographic hash of the private key and the cryptographic hash of the mobile identity key lack the threshold correspondence, declining to verify a user of the mobile device as the identity system user.

15. The method of claim 11, further comprising:
transmitting the verification results to the third-party user upon implementing the smart contract.

* * * * *